(No Model.)

J. R. DAVIS.
WHIFFLETREE HOOK.

No. 428,896. Patented May 27, 1890.

Witnesses
Geo. W. Young.
Wm Koley

Inventor
John R. Davis
By Stout & Underwood
Attorneys

UNITED STATES PATENT OFFICE.

JOHN R. DAVIS, OF RACINE, WISCONSIN.

WHIFFLETREE-HOOK.

SPECIFICATION forming part of Letters Patent No. 428,896, dated May 27, 1890.

Application filed November 25, 1889. Serial No. 331,411. (No model.)

*To all whom it may concern:*

Be it known that I, JOHN R. DAVIS, of Racine, in the county of Racine, and in the State of Wisconsin, have invented certain new and useful Improvements in Whiffletree-Hooks; and I do hereby declare that the following is a full, clear, and exact description thereof.

My invention relates to whiffletree-hooks; and it consists in certain peculiarities of construction, as will be fully set forth hereinafter and subsequently claimed.

Figure 1:
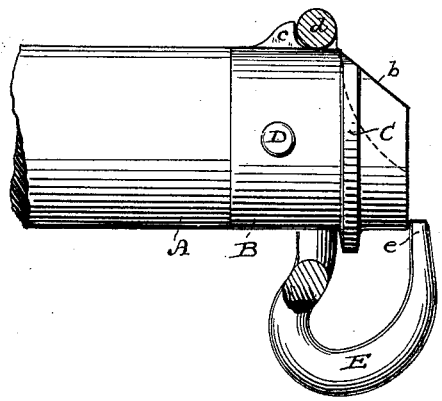
Figure 2:
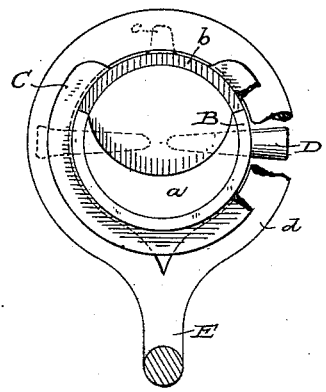
Figure 3:
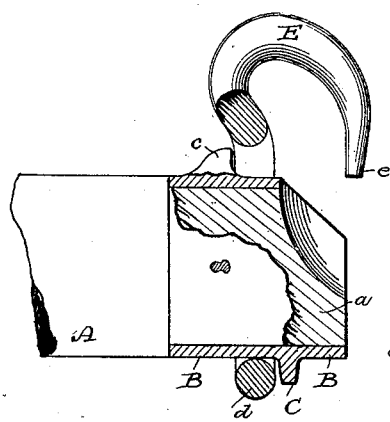

In the drawings, Figure 1 is a plan view of my present device, partly broken away or in section; Fig. 2, an end view, also partly broken away or in section; and Fig. 3, a view similar to Fig. 1, but with the hook turned to a different position.

My present device is an improvement on that patented to me on February 5, 1889, No. 397,112; and, like that device, it consists of a ferrule and ring to be applied to the end of a whiffletree. A represents said whiffletree having, preferably, a reduced end $a$, on which the ferrule B is fitted. This ferrule B is cut out at its outer end from about one-third to one-half of its circumference, as shown at $b$, similar in this respect to the ferrule in my said patent, and also, as in said patent, is preferably secured to the whiffletree ends by malleable iron, tapered and grooved pins D, driven through holes in opposite sides of said ferrule into the wood of said whiffletree. Unlike my said patented application, the outer end of my present ferrule B is of the same thickness as that of the rest of the body of the ferrule, instead of being provided with a flange, beveled or otherwise, and I further dispense with the lugs or stops, which in said prior device extended back from the outer end of the ferrule; but from about the base or inner end of one side wall of the cut-away portion $b$ (as best shown in Fig. 1) to the corresponding base of the other side wall of said portion I provide the continuous bead C, placing the only lug $c$ on a line about midway between the opposing ends of the bead C, but nearer the inner end of the ferrule, so as to leave just room enough between said bead and lug for the ring $d$ of the hook E, the adjacent end of the said lug $c$ being preferably concaved or rounded out to more closely fit the said hook-ring $d$. I form the end $e$ of the hook E in a practically-straight line with the end of the whiffletree, so that the said end may just rest and slide on the outer end of the ferrule B. The hook-ring $d$ is attached and detached in a similar manner as with my said prior patent, the whiffletree end being cut away to correspond to the cut-away portion $b$ of the ferrule.

Although the changes are slight between this device and my prior patent named, I regard them as important and valuable, besides which much less iron is required in their construction, and hence they can be furnished for a less price, and are lighter and neater, and as they do not have any outer end flange they obviate the danger of breaking down or battering such flange, which occurred from time to time with my prior devices in driving them upon whiffletree ends. The great advantage, however, of my present construction lies in the continuous bead C, which serves to always keep the hook-ring and hook exactly true, whereas with the points or lugs previously employed the said ring would frequently slip and tilt, especially when the hook was in line with one of said points or lugs, and the friction would soon wear away said lugs unevenly, thereby impairing the usefulness of the device, all of which is obviated by my present construction.

Having thus described my invention, what I claim as new, and desire to secure by Letters Patent, is—

1. The combination, with a whiffletree-ferrule of the same diameter and thickness of metal at its ends as its body and cut away for a portion of its circumference at its outer end, of a continuous bead extending around the said ferrule from the inner end of one side wall to the inner end of the other side wall of said cut-away portion, a lug in line with the center of said cut-away portion, but nearer the inner end of the ferrule, and a ring surrounding said ferrule and in contact with said lug and with said bead throughout the entire length of the latter and terminating in an inturned hook having a straight end resting on the outer end of said ferrule, substantially as set forth.

2. The combination, with the whiffletree A, having a reduced and notched end $a$, of the ferrule B, fitted thereon and having a body of the same diameter and thickness throughout and notched out, as shown at $b$, the continuous band C, extending from one edge of the notched-out portion $b$ to the other edge thereof, the lug $c$, having a concave or rounded end, hook-ring $d$, and hook E, terminating in a straight inturned end $e$, substantially as set forth.

In testimony that I claim the foregoing I have hereunto set my hand, at Racine, in the county of Racine and State of Wisconsin, in the presence of two witnesses.

JOHN R. DAVIS.

Witnesses:
WM. HENRY MILLER,
FRANK E. JARVIS.